United States Patent
Auner et al.

(10) Patent No.: US 9,458,294 B2
(45) Date of Patent: Oct. 4, 2016

(54) METHOD FOR REMOVING IMPURITIES FROM SILICON

(75) Inventors: Norbert Auner, Glashuetten (DE); Christian Bauch, Muldenstein (DE); Sven Holl, Gueckingen (DE); Rumen Deltschew, Leipzig (DE); Javad Mohsseni, Bitterfeld-Wolfen (DE); Gerd Lippold, Leipzig (DE); Thoralf Gebel, Dresden (DE)

(73) Assignee: Spawnt Private S.à.r.l., Luxembourg (LU)

( * ) Notice: Subject to any disclaimer, the term of this patent is extended or adjusted under 35 U.S.C. 154(b) by 1066 days.

(21) Appl. No.: 13/513,611

(22) PCT Filed: Dec. 6, 2010

(86) PCT No.: PCT/EP2010/068974
§ 371 (c)(1),
(2), (4) Date: Sep. 19, 2012

(87) PCT Pub. No.: WO2011/067410
PCT Pub. Date: Jun. 9, 2011

(65) Prior Publication Data
US 2013/0039830 A1    Feb. 14, 2013

(30) Foreign Application Priority Data
Dec. 4, 2009 (DE) .................. 10 2009 056 731

(51) Int. Cl.
| | |
|---|---|
| C01B 33/08 | (2006.01) |
| C08G 77/60 | (2006.01) |
| C01B 33/04 | (2006.01) |
| C01G 17/00 | (2006.01) |
| C08G 79/14 | (2006.01) |

(52) U.S. Cl.
CPC .............. *C08G 77/60* (2013.01); *C01B 33/04* (2013.01); *C01G 17/00* (2013.01); *C08G 79/14* (2013.01); *Y02P 20/582* (2015.11)

(58) Field of Classification Search
CPC ..... C01B 33/00; C01B 33/04; C01B 33/037; C01B 33/08; C09K 3/00; C01G 17/00; C01G 79/14; C01G 77/60
See application file for complete search history.

(56) References Cited

U.S. PATENT DOCUMENTS

| | | |
|---|---|---|
| 3,378,344 A | 4/1968 | Horn et al. |
| 3,401,183 A | 9/1968 | Berger |
| 3,704,261 A | 11/1972 | Berger et al. |
| 3,926,833 A | 12/1975 | Hoffman et al. |
| 4,200,621 A | 4/1980 | Liaw et al. |
| 4,295,986 A | 10/1981 | Gordon |
| 4,312,849 A | 1/1982 | Kramer |
| 4,374,110 A | 2/1983 | Darnell et al. |
| 4,407,783 A | 10/1983 | Ulmer et al. |
| 4,499,063 A | 2/1985 | Grosbois et al. |
| 4,529,707 A | 7/1985 | Cowles et al. |
| 4,601,798 A | 7/1986 | Jacubert et al. |
| 4,629,801 A | 12/1986 | Soula et al. |
| 4,639,361 A | 1/1987 | Aono et al. |
| 4,725,419 A | 2/1988 | Marlett et al. |
| 4,755,370 A | 7/1988 | Kray et al. |
| 4,762,808 A | 8/1988 | Sharp et al. |
| 4,777,023 A | 10/1988 | Fieselmann |
| 4,824,657 A | 4/1989 | Jadhav |
| 4,855,120 A | 8/1989 | Marlett |
| 5,061,470 A | 10/1991 | Park |
| 5,126,473 A | 6/1992 | Klockner et al. |
| 5,455,367 A | 10/1995 | Klein et al. |
| 8,722,913 B2 | 5/2014 | Lang et al. |
| 2007/0078252 A1 | 4/2007 | Dioumaev |
| 2009/0169457 A1 | 7/2009 | Auner et al. |
| 2010/0221169 A1 | 9/2010 | Knies et al. |
| 2011/0150740 A1 | 6/2011 | Auner et al. |
| 2011/0284796 A1 | 11/2011 | Auner et al. |
| 2011/0305619 A1* | 12/2011 | Mohsseni-Ala ...... C01B 33/027 423/341 |
| 2012/0308464 A1 | 12/2012 | Bauch et al. |

FOREIGN PATENT DOCUMENTS

| | | |
|---|---|---|
| BE | 890.356 | 1/1982 |
| CA | 1 189 286 | 6/1985 |
| CN | 101107196 | 1/2008 |
| DE | 340912 | 9/1921 |
| DE | 1049835 | 12/1956 |
| DE | 1 034 159 | 7/1958 |
| DE | 1 055 511 | 4/1959 |
| DE | 1 085 505 | 7/1960 |

(Continued)

OTHER PUBLICATIONS

WO2009/143825, see machine translations.*
Akhtar, M., "Preparation of Ultra-High Purity Higher Silanes and Germanes," *Synthesis and Reactivity in Inorganic, Metal-Organic, and Nano-Metal Chemistry*, 1986, vol. 16, No, 5, pp. 729-748.
Andrews, T.D. et al., "Further Studies on the Silicon—Germanium Hydrides," *J. Chem. Soc. (A)*, 1966, pp. 46-48.
Beattie, I.R. et al., "The Crystal Structure and Raman Spectrum of $Ge_5Cl_{12} \cdot GeCl_4$ and the Vibrational Spectrum of $Ge_2Cl_6$," *Inorg. Chem.*, 1998, vol. 37, pp. 6032-6034.
Bellama, J.M. et al., "Synthesis of the Hydrides of Germanium, Phosphorus, Arsenic, and Antimony by the Solid-Phase Reaction of the Corresponding Oxide with Lithium Aluminum Hydride," *Inorg. Chem.*, 1968, vol. 7, No. 10, pp. 2070-2072.

(Continued)

*Primary Examiner* — Melvin C Mayes
*Assistant Examiner* — Smita Patel
(74) *Attorney, Agent, or Firm* — DLA Piper LLP (US)

(57) ABSTRACT

A method for removing impurities from silicon includes A) providing metallic silicon having impurities, B) mixing the metallic silicon with at least one halogenated polysilane of Formula $SiX_n$, where X is halogen, which may be partially replaced by hydrogen, and where $1<n<2.5$, and C) heating the metallic silicon so that there is at least partly a reaction of the impurities with the at least one halogenated polysilane or with a decomposition product of the at least one halogenated polysilane, wherein C) may take place before, during and/or after B).

16 Claims, No Drawings

(56) References Cited

FOREIGN PATENT DOCUMENTS

| | | |
|---|---|---|
| DE | 1 096 341 | 1/1961 |
| DE | 1 098 931 | 2/1961 |
| DE | 1 187 614 | 2/1965 |
| DE | 29 29 089 | 1/1980 |
| DE | 33 42 496 | 6/1985 |
| DE | 35 06 071 | 8/1985 |
| DE | 36 35 064 A1 | 4/1988 |
| DE | 43 13 130 | 5/1994 |
| DE | 43 06 106 | 9/1994 |
| DE | 108077 | 4/1998 |
| DE | 198 12 587 | 9/1999 |
| DE | 103 37 309 | 3/2005 |
| DE | 10 2005 024 041 | 11/2006 |
| DE | 10 2007 007 874 | 8/2008 |
| DE | 10 2008 025 260 | 12/2009 |
| DE | 10 2008 025 261 | 12/2009 |
| DE | 102008025263 | 12/2009 |
| DE | 10 2008 036 143 | 2/2010 |
| DE | 10 2009 056 731 | 6/2011 |
| EP | 0 007 063 | 1/1980 |
| EP | 0 052 808 | 6/1982 |
| EP | 0 054 650 | 6/1982 |
| EP | 0 105 778 | 4/1984 |
| EP | 0 111 924 | 6/1984 |
| EP | 0 192 528 | 8/1986 |
| EP | 0 300 320 | 1/1989 |
| EP | 0 316 472 | 5/1989 |
| EP | 0 412 342 | 2/1991 |
| EP | 1 867 604 | 12/2007 |
| FR | 1429930 | 1/1966 |
| GB | 793718 | 4/1958 |
| GB | 823483 | 11/1959 |
| GB | 823496 | 11/1959 |
| GB | 832333 | 4/1960 |
| GB | 851962 | 10/1960 |
| GB | 909950 | 11/1962 |
| GB | 922879 | 4/1963 |
| GB | 1110627 | 4/1968 |
| JP | 57-135712 | 8/1982 |
| JP | 58-500895 | 6/1983 |
| JP | 58-156522 | 9/1983 |
| JP | 59-500416 | 3/1984 |
| JP | 61-191512 | 8/1986 |
| JP | 61-205614 | 9/1986 |
| JP | 1-234316 | 9/1989 |
| JP | 4-130010 | 5/1992 |
| JP | 2002-246384 | 8/2002 |
| JP | 2009-543828 | 12/2009 |
| JP | 2010-111544 | 5/2010 |
| JP | 2011-520762 | 7/2011 |
| JP | 2013-512840 | 4/2013 |
| WO | 81/03168 | 11/1981 |
| WO | 82/04434 | 12/1982 |
| WO | 84/02332 | 6/1984 |
| WO | 03/010090 | 2/2003 |
| WO | 2005/015609 | 2/2005 |
| WO | 2006/125425 | 11/2006 |
| WO | 2007/062056 | 5/2007 |
| WO | 2007/062096 | 5/2007 |
| WO | 2008/009473 A1 | 1/2008 |
| WO | 2008/035799 | 3/2008 |
| WO | 2008/051328 | 5/2008 |
| WO | 2009/047238 | 4/2009 |
| WO | 2009/143823 | 12/2009 |
| WO | 2009/143824 | 12/2009 |
| WO | 2009/143825 A2 | 12/2009 |
| WO | 2011/067413 | 6/2011 |
| WO | 2011/067416 | 6/2011 |

OTHER PUBLICATIONS

Bethke, G.W. et al., "Vibrational Spectrum of Disilane," *The Journal of Chemical Physics*, May 1957, vol. 26, No. 5, pp. 1107-1117.

Chen, J.M. et al., "X-Ray Initiated Molecular Photochemistry of Cl-Containing Absorbates on a Si(1<ce:hsp sp="0.12"/>0<ce:hsp sp="0.12"/>0) Surface Using Synchrotron Radiation," *Surface Science*, 2006, vol. 600, No. 18, pp. 3544-3549.

Chizmeshya, V.G. et al., "Synthesis of Butane-Like SiGe Hydrides: Enabling Precursors for CVD of Ge-Rich Semiconductors," *J. Am. Chem. Soc.*, 2006, vol. 128, pp. 6619-6930.

Dennis, L.M. et al., "Germanium. XXVII. Germanium Dichloride," *Journal of the American Chemical Society*, Apr. 1929, vol. 51, pp. 1151-1154.

Dennis, L.M. et al., "Germanium. VII. The Hydrides of Germanium," *Journal of the American Chemical Society*, Mar. 1924, vol. 46, pp. 657-674.

Dennis, L.M. et al., "Germanium. XXIX. Germanium Monohydride," *Journal of the American Chemical Society*, Jun. 1930, vol. 52, pp. 2369-2372.

Drake, J.E. et al., "The Preparation and Identification of Volatile Germanes," *Proceedings of the Chemical Society*, Oct. 1961, pp. 379-.380.

Drake, J.E. et al., "Hydrides of Germanium," *Journal of the American Chemical Society*, 1962, pp. 2807-2813.

Fehér, V.F. et al., "Die Darstellung von Germaniumwasserstoffen aus Magnesiumgermanid und Hydraziniumchlorid in wasserfreiem Hydrazin," *Zeitschrift für Anorganische und Allgemeine Chemie*, 1958, vol. 297, pp. 14-22 (English translation of Summary only).

Finholt, A.E. et al., "The Preparation and Some Properties of Hydrides of Elements of the Fourth Group of the Periodic System and of their. Organic Derivatives," *Journal of the American Chemical Society*, Nov. 1947, vol. 69, pp. 2692-2696.

Gaspar, P.P. et al., "Preparation of Trisilane by the Schlesinger Method," *Inorganic Chemistry*, May 1970, vol. 9, No. 5, pp. 1272-1273.

Gokhale, S.D. et al., "Synthesis of the Higher Silanes and Germanes," *J. Inorg. Nucl. Chem.*, 1965, vol. 27, pp. 1911-1916.

Häberle, K. et al., "XVI *. Synthase α,ω-Dichlorierter Polygermane $Cl(Ph_2Ge)_nCl$ (n=2,3,4,) Durch Germylen-Einschub," *Journal of Organometallic Chemistry*, 1986, vol. 312, pp. 155-165 (English translation of summary only).

Jolly, W.L. et al., "Electric Discharge Reactions of Phosphorus Trichloride and Germanium Tetrachloride," *Inorganic Chemistry*, Nov. 1962, vol. 1, No. 4, pp. 958-960.

Mackay, K,M. et al., "Studies on the Isomers of Pentagermane and Tetragermane," *J. Chem. Soc. (A)*, 1968, pp. 2312-2316.

Mackay, K.M. et al., "Silicon—Germanium Hydrides, $Si_2GeH_8$ and $SiGe_2H_8$," *J. Chem. Soc. (A)*, 1969, pp. 2937-2942.

Padma, D.K. et al., "Silicon Tetrafluoride: Preparation and Reduction with Lithium Aluminum Hydride," *Journal of Fluorine Chemistry*, 1979, vol. 14, pp. 327-329.

Ritter, C.J. et al., "Synthesis and Fundamental Studies of $(H_3Ge)_8SiH_{4-x}$ Molecules: Precursors to Semiconductor Hetero- and Nanostructures on Si," *J. Am. Chem. Soc.*, 2005, vol. 127, No. 27, pp. 9855-9864.

Royen, P. et al., "Zur Darstellung gemischter, flüchtiger Hydride der 4. und 5. Hauptgruppe," *Zeitschrift für anorganische und allgemeine Chemie*, 346, 1966, pp. 290-294 (English translation of Summary only).

Schmeisser, V.M. et al., "Über das Siliciumdichlorid $[SiCl_2]_x^1$)," *Zeitschrift für anorganische und allgemeine Chemie*, 334, 1964, pp. 50-56 (English translation of Abstract and Summary only).

Shriver, D. et al., "The Microwave Synthesis of Digermanium Hexachloride," *Journal of the American Chemical Society*, Dec. 20, 1958, vol. 80, pp. 6692-6693.

Timms, P. L. et al., "The Silicon—Germanium Hydrides," *Journal of the Chemical Society*, 1964, pp. 1467-1475.

Timms, P.L. et al., "The Formation of Some Volatile Hydrides from Lower Oxides," *Inorganic Chemistry*, 1964, vol. 3, No. 4, pp. 606-607.

(56) References Cited

OTHER PUBLICATIONS

Amberger, E., *Angew. Chem. 71*, No. 11, 1959, pp. 372-373, w/ brief English summary Lobreyer, T. et al., *Angewandte Chemie 105*, No. 4 (1993), pp. 587-588, w/ brief English summary.
Royen, P. et al., ("Darstellung"), *Angew. Chem. 76*, No. 7, 1964, pp. 302-303, w/ brief English summary Varma, R. et al., *Angewandte Chemie 76*, (1964), p. 649, w/ brief English summary.
Royen, P. et al., *Zeitschrift für Anorganische und Allgemeine Chemie 215* (1933), pp. 295-309, w/ brief English summary Royen, P. et al., *Zeitschrift für Anorganische und Allgemeine Chemie 211* (1933), pp. 412-422, w/ brief English summary.
Shwarz, R. et al., *Zeitschrift für Anorganische und Allgemeine Chemie 275*, (1954), pp. 1-20, w/ brief English summary Jolly, W.L. et al., *Inorganic Syntheses 7* (1963), No. 7, pp. 34-44, w/ brief English summary.
Wartenberg, *Zeitschrift für Anorganische und Allgemeine Chemie* (1956), pp. 372-376, w/ brief English summary Angus, P.C. et al., *Journal of the Chemical Society*, Chemical Communications (1973), p. 127, w/ brief English summary.
Office Action issued Sep. 25, 2014 from corresponding Taiwanese Patent Application No. 99142320 along with an English translation.
Auner, N., "Von Sand und Sonne zu Elekrizität und Wasserstoff," *Forschung Frankfurt*, 2010, pp. 1-6 and one sheet of English summary.
Schmeisser, M. et al., "Darstellung und chemisches Verhalten von Silliciumsubhalogeniden," Fortschritte der chemischen Forschung (Hafner et al.), 1967, cover, index, pp. 3-22 and one sheet of English summary.
Besson, A. et al., "Comptes Rendus Herbdomadaires des Séances de 1 Académie des Sciences," Gauthier-Villars, 1909, cover, pp. 1-7 and one sheet of English summary.
Vrandi-Piskou, D. et al., "Chromatographie en phase gazeuse des premiers membres de la série homologue SinCL2n+2," *Journal of Chromatography*, 1966, pp. 449-451 and one sheet of English summary.
Höfler, F. et al., "Die Perhalgenierten Isotetrasilane $Si_4ClF_9$ und $Si_4Cl_{10}$," *Inorg. Nucl. Chem. Letters*, 1975, vol. 11, pp. 743-747 and one sheet of English summary.
Höfler, F. et al., "Darstellung und Eigenschaften einiger hochchlorierter Oligosilane," *Z. anorg. allg. Chem.*, 1997, pp. 1-8 and one sheet of English summary.
Kautsky, H. et al.,: "Die Anwendung von Hochspannungskurzchlußfunken zur chemischen Syntese," Chemische Berichte, 1956, cover, pp. 571-581 and one sheet of English summary.
"Prüfbericht Nr. A140002136" *AQura Analytical Solutions*, 1-2 and one sheet of English summary.
Streitberger, H-J. et al., "Verdünnungsmittel," Römpp Online, 2014, pp. 1-2 and one sheet of English summary.
"$^{29}$Si NMR-Spektrum von $Si_5Cl_{12}$ (mit Verunreinigungen durch $SiCl_4$)," one page and one sheet of English summary.
Japanese Notice of Reasons for Refusal dated Jul. 4, 2014 from corresponding Japanese Application No. 2012-541537.
European Opposition dated Jul. 29, 2014 from corresponding European Application No. 10 787 124.6.
Hengge, E., "Inorganic Silicon Halides," *Halogen Chemistry*, 1967, vol. 2, pp. 169-232.
Martin, G., "Researches on Silicon-Compounds. Part VI.," *J. Chem. Soc.*, 1914, vol. 105, pp. 2836-2860.
Urry, G. "Recent Developments in the Chemistry of Perchloropolysilanes," *J. Inorg. Nucl. Chem.*, 1964, vol. 26, pp. 409-414.

\* cited by examiner

METHOD FOR REMOVING IMPURITIES FROM SILICON

RELATED APPLICATIONS

This is a §371 of International Application No. PCT/EP2010/068974, with an international filing date of Dec. 6, 2010 (WO 2011/067410 A1, published Jun. 9, 2011), which is based on German Patent Application No. 10 2009 056 731.3, filed Dec. 4, 2009, the subject matter of which is incorporated by reference.

TECHNICAL FIELD

This disclosure relates to a method for removing impurities from silicon, more particularly for removing metallic and/or nonmetallic impurities, and to a material which is used for this purpose and which comprises a halogenated polysilane and/or a halide-containing silicon.

BACKGROUND

The term "silicon" encompasses all Si grade stages, especially metallurgical silicon which has been obtained directly from the carbothermal reduction of $SiO_2$, UMG silicon (UMG=upgraded metallurgical grade), solar-grade silicon, and electronic-grade silicon, and also the associated raw silicon and the corresponding precursors of the Si grade stages and of the corresponding raw silicon.

Metallurgical silicon encompasses all Si grade stages which do not meet the purity criteria for semiconductor applications. Metallurgical silicon or UMG silicon are not suitable for production of solar cells or applications in the electronics industry since they still contain relatively high concentrations of impurities which for these purposes are unwanted and must be removed.

For the removal of impurities from silicon melts it is possible to employ gaseous halogen sources. More particularly, halogen gas, halogen-containing gas mixtures or gaseous, halogen-containing compounds are introduced into the Si melt. For example, DE 3635064 C2 discloses a method for purifying silicon by treating a silicon melt with a gas mixture comprising hydrogen chloride and/or halosilanes, and by subsequent vacuum treatment at less than 0.1 mbar.

Implementing a technology of that kind, however, is very complex, since the halogen or the gaseous, halogen-containing compounds must be introduced directly into the melt which is generally accomplished by tubes or special nozzles. Consequently, the possibility for homogeneous distribution of the halogen over the entire melt is limited. Moreover, the devices for introducing the halogen into the melt may impair the melt itself. This means that, for example, there may be impurities which originate from the gas introduction devices.

WO 2009/143825 A2 describes a method for purifying metallurgical silicon by admixing metallurgical silicon with solid, halide-containing silicon, preparing a melt from the substances, and sublimating out the impurities from the melt and removing them in the form of metal halides.

Implementing a technology of that kind, however, is dependent on preparation of the halide-containing silicon needed for the purpose, that preparation generally taking place from halogenated polysilanes. In that case, those halogenated polysilanes must first be converted into a material whose halogen content is reduced significantly in comparison to the starting material (and also into volatile halosilanes having an increased halogen content in comparison to the starting material). The material obtained in that conversion is the halide-containing silicon.

It could thus be helpful to provide an improved method for purifying silicon that is simplified.

SUMMARY

We provide a method for removing impurities from silicon, including A) providing metallic silicon having impurities, B) mixing the metallic silicon with at least one halogenated polysilane of Formula $SiX_n$, where X is halogen, which may be partly replaced by hydrogen, and where $1<n<2.5$, and C) heating the metallic silicon so that there is at least partly a reaction of the impurities with the at least one halogenated polysilane or with a decomposition product of the at least one halogenated polysilane, wherein C) may take place before, during and/or after B).

We also provide a material including a silicon-halogen compound selected from the group consisting of halogenated polysilanes, halogenated polysilane mixtures, halide-containing silicon, and mixtures thereof, and also a protective material against moisture.

DETAILED DESCRIPTION

A halogenated polysilane of composition $SiX_n$ or a mixture of halogenated polysilanes having the average composition $SiX_n$, where $1<n<2.5$ and where X=halogen (which may be partly replaced by hydrogen), is added directly to impurities-containing silicon without generating beforehand, in a separate process step, halide-containing silica. Then, from the starting materials, a melt is prepared, whereupon the impurities are removed from the mixture, in particular in the form of element halides.

Therefore, in a first step A), metallic silicon to be purified is provided as was described in more detail above. This silicon is heated in a step C) so that, in the normal case, a melt of the silicon to be purified is formed. Even before heating, the silicon to be purified may be admixed with at least one halogenated polysilane of the formula $SiX_n$. This mixing in accordance with step B), however, may also take place during heating, or else the halogenated polysilane can be added to the already melted silicon to be purified. The addition or admixing may of course also take place during two or all three of the stated states. In step C), then, there is a reaction of the impurities with the at least one halogenated polysilane or with a decomposition product of the at least one halogenated polysilane.

A reaction between an impurity and the halogenated polysilane and/or the decomposition product thereof means more particularly that the impurities, which are present, for example, in elemental form, form a halide with the halogen of the polysilane and/or of the decomposition product, the halide typically being volatile and therefore able to escape. Especially, when fluorine-containing halogenated polysilanes are used, formation of a slag is often observed, and the halogen-containing impurities are in this case present in the slag. The slag can then be removed from the surface of the melted silicon. With regard to other halogen compounds, in contrast, outgassing of the element halides formed will generally be observed. With certain impurities, there may both be outgassing and dissolution in the slag. Particular decomposition products of the halogenated polysilane include silicon tetrahalide and hexahalodisilane, which are formed—as mentioned above—in the course of the thermal decomposition of polysilanes.

Where reference is made to a halogenated polysilane or "at least one halogenated polysilane," this means that it is possible to not only use pure compounds for purifying impurities-containing silicon, but also mixtures of different halogenated polysilanes. These mixtures may comprise different halogens. Frequently, however, only one single halogen will be present in the mixtures. In the normal case—also because of the possible preparation processes—mixtures of halosilanes are frequently employed. Accordingly, where reference is made below to "the halogenated polysilane" or "the at least one halogenated polysilane," this always also means that a mixture of halogenated polysilanes may be involved.

A halogenated polysilane may be a compound which consists of silicon and halogen (X=F, Cl, Br, I), more particularly of silicon and chlorine, or which comprises silicon and halogen and which further in its structure has at least one Si—Si bond.

It has been recognized that as the temperature of the material goes up, the at least one halogenated polysilane employed undergoes conversion in stages to silicon, with a sustained release of halosilanes, more particularly low-molecular halosilanes such as, for example, $SiX_4$ and $Si_2X_6$. In comparison to methods using halide-containing silicon for purification, therefore, longer reaction times with the impurities (or exposure times to the impurities) can be realized after the material has been added to the silicon to be purified, including actually during heating the materials mixture through to melting. Therefore, a purifying effect by the halogenated polysilanes already occurs in a temperature range in which silicon is still present in solid form. In contrast to the prior art, therefore, there is no proportion, or only a smaller proportion, of the halogen present in the starting material, i.e., more particularly, in the halogenated polysilane, that is lost as a result of our preparation process, without any contact or reaction with the impurities. Accordingly, the usable halogen content is increased significantly relative to the halide-containing silicon of the prior art, and thereby enhances the purification capacities.

At the same time, owing to the higher halide content of the halogenated polysilanes, smaller amounts of additive are needed to provide the same amount of halide. This difference is further enhanced by the fact that in the case of preparing halide-containing silicon from halogenated polysilanes that is necessary in accordance with the prior art, a part of the halide is lost in the form of $SiX_4$ and/or other halosilanes in the course of the preparation of the silicon and is not available in the purification step.

We also recognized that for purification of impurities-containing silicon, it is possible to use not chlorine gas, chlorine-containing gas, or gaseous chlorosilane, but instead a nongaseous material, more particularly liquid or solid halogenated polysilanes or mixtures thereof, it being possible for the solid halogenated polysilanes to be selected such that they are soluble in inert solvents.

Lastly, with our halogenated polysilanes, it is possible to achieve a particularly homogeneous distribution of the "purifying agent" in the silicon melt, but also already over a bed of silicon particles. According to the prior-art method, this is not possible to this degree either with gaseous "purifying agents" or with the solid "purifying agents" of WO 2009/143825 A2. As a result of the particularly homogeneous distribution in our method and of the particularly intensive contacting of the silicon particles to be purified, it is possible with our method to achieve effective removal even of impurities which are otherwise particularly difficult to remove such as, for example, metals which form halides in high oxidation states (for example, molybdenum or tungsten). Moreover, our method is suitable for purifying other metals such as transition metals (for instance titanium) or main-group metals (for instance aluminum), for example, or else for removing nonmetallic impurities which may originate, for example, from dopants (for example, boron, phosphorus or arsenic).

It should be pointed out in particular that with our halogenated polysilanes, an intensive wetting of the silicon particles is in general possible. When, subsequently, these wetted particles are heated, a layer is typically formed directly on the silicon particles, and so halogen-containing decomposition products are formed directly on the surface of the silicon to be purified and are able to react there with the impurities. A layer formed in this way may be formed in particular in the manner of a foam or of a porous crust, with at least a part of the decomposition products remaining enclosed in the cavities up to very high temperatures and, hence, are able to act on the surface of the silicon particles without escaping beforehand. To a certain extent, therefore, the reactive silicon halides of low molecular mass and/or the halogen which reacts with the impurities is held in a concentrated form at the location at which it is to act.

The halogen:silicon ratio of the halogenated polysilane used, or the average halogen:silicon ratio of the mixture of halogenated polysilane, may be greater than 1:1 and less than 2.5:1. More particularly, it may be 1.5:1 to 2.3:1, as for example 1.6:1 to 2.25:1. As a lower limit with regard to usability, it is possible in particular to cite the perhalogenated isomers of pentasilane since pentasilane can no longer be distilled without decomposition and, accordingly, a simple evaporation of the compound which may already be adsorbed, for example, on the surface of a silicon particle for purification is no longer possible. Accordingly, in particular with halogenated polysilanes having 5 or more silicon atoms, it is possible to force a reaction with the impurities. A particularly low halogen:silicon ratio of 1.6:1 exists for hexadecachlorodecasilane (which possesses an adamantane-like structure) and similar compounds.

Compounds or mixtures with the above-stated halogen:silicon ratios are, in general, simple to prepare and also have the advantage that they usually have a liquid or viscous-fluid consistency or can be brought into solution easily (for example, by the corresponding tetrahalosilanes such as $SiCl_4$, for example). Accompanying these properties is the ability for the halogenated polysilanes to fully or at least substantially fully wet and/or cover the particles of the silicon to be purified and, hence, to effectively form a layer of the "purifying agent" on the silicon particles to be purified. This is possible neither with gaseous nor with solid materials of the kind described according to the prior art. When thus-treated silicon particles to be purified are heated, the contact of the impurities with the halogenated polysilanes and/or with their decomposition products of the halogenated polysilanes takes place from the first instance onward, owing to the full or substantially full wetting and/or covering of the particles for purification. In accordance with the principle of Le Chatelier, therefore, conversion of the impurities into element halides is forced from the beginning onward. It should be noted here that impurities are frequently present at grain boundaries or other crystal defects which are to some extent easily accessible from the surface of a particle. Accordingly, still in the solid state, a reaction may commence between the impurities and the halogenated polysilanes and/or the decomposition products formed from them, since reactions in the solid state are readily possible especially in the case of the crystal defects.

To achieve particularly good wettability of the silicon particles to be purified, in the case where the halogenated polysilanes, as, for example, the polychlorosilanes have a consistency which is not liquid or viscous-fluid, it is possible to use solutions or suspensions in $SiX_4$, more particularly $SiCl_4$, wherein at least 50% of the mass employed is soluble when the halogenated polysilane is suspended in 5 times the amount by weight of $SiX_4$ (or else, alternatively, in $Si_2X_6$ or $Si_3X_8$ or other oligohalosilanes or oligohalosilane mixtures, more particularly mixtures of compounds having up to six silicon atoms). More particularly it is possible to use solutions or suspensions in $SiX_4$ for which at least 50% of the mass employed is soluble when the halogenated polysilane is suspended in 2 times the amount by weight of $SiX_4$ (or else, alternatively, in $Si_2X_6$ or $Si_3X_8$ or other oligohalosilanes or oligohalosilane mixtures, more particularly mixtures of compounds having up to 6 silicon atoms). A solubility of this kind is generally achieved when halogenated polysilanes with a halogen:silicon ratio of 1.4:1, but at least of 1.5:1, are present. In the normal case, halogenated polysilanes having a halogen:silicon ratio of 1.2:1, but at least of 1.3:1, are also soluble in $SiX_4$ or oligohalosilanes to an extent such that the wetting of the silicon particles for purification is very good. The statements in this paragraph apply especially when the solvent used is the $SiX_4$ or oligohalosilane that comprises the same halogen as the halogenated polysilane to be dissolved.

The halogenated polysilanes may contain besides silicon and halogen also hydrogen. However, the hydrogen content of these compounds will generally be relatively low and will typically not amount to more than 5 atomic %. Frequently, the fraction will amount even to <1%. Furthermore, very frequently, halogenated polysilanes (or halogenated polysilane mixtures) are used that contain no hydrogen at all. The hydrogen may be present in the halogenated polysilanes as a result of the preparation process. To a certain extent, however, it may also be incorporated intentionally since certain impurities are somewhat easier to remove in the presence of hydrogen. This is inter alia attributable to formation of HCl during decomposition since HCl develops an etching effect even at a lower temperature than the chlorosilanes/polychlorosilanes.

In general, for all of the compounds specified, it is the case that they have customary purity grades. This means that the purity of a compound which consists of particular kinds of atoms, or of a mixture which consists of a plurality of such individual compounds, is at least 99.5%, frequently at least 99.95%, and the proportion of the impurities is in particular less than 10 ppm (where it is always % by weight that is meant).

As starting material it is possible in particular for plasma-chemically or thermally prepared chloro-polysilanes to be used.

Plasma-chemically prepared polysilanes may comprise, in particular, halogenated polysilanes as pure compound or as a mixture of compounds having each at least one direct Si—Si bond, the substituents consisting of halogen or of halogen and hydrogen and the atomic ratio of substituent:silicon in the composition being at least 1:1, where
  a. the H content of the polysilane is less than 2 atomic %,
  b. the polysilane contains virtually no branched chains and rings, with the amount of branching points in the short-chain fraction, more particularly of the summed fraction of the perhalogenated derivatives of neohexasilane, neopentasilane, isotetrasilane, isopentasilane, and isohexasilane, based on the overall product mixture, being below 1%,
  c. it has a Raman molecular vibration spectrum of $I_{100}/I_{132}$ greater than 1, where $I_{100}$ is the Raman intensity at 100 $cm^{-1}$ and $I_{132}$ is the Raman intensity at 132 $cm^{-1}$, and
  d. in $^{29}Si$ NMR spectra, it has its significant product signals in the chemical shift range of +15 ppm to −7 ppm when the substituents are chlorine.

The amount of branching sites is determined by integration of the $^{29}Si$ NMR signals for the tertiary and quaternary Si atoms. The short-chain fraction is the fraction of halogenated polysilanes referring to all silanes having up to six silicon atoms. Alternatively, the fraction of perhalogenated short-chain silanes can be determined particularly quickly if the procedure—as shown by way of example for the perchlorinated compounds—is adopted as follows. First, the range of +23 ppm to −13 ppm in the $^{29}Si$ NMR is integrated (in which, in particular, signals of primary and secondary silicon atoms are found), and subsequently the signals for tertiary and quaternary Si atoms of −18 ppm to −33 ppm and −73 ppm to −93 ppm of the respective perchlorinated derivatives of the following compounds: neohexasilane, neopentasilane, isotetrasilane, isopentasilane, and isohexasilane. Subsequently, the ratio of the respective integrations, $I_{short-chain}:I_{primary/secondary}$, is determined. With regard to the summed integration for the respective perchlorinated derivatives of neohexasilane, neopentasilane, isotetrasilane, isopentasilane, and isohexasilane, this ratio is less than 1:100.

The synthesis and characterization of these long-chain, halogenated polysilanes is also described in WO 2009/143823 A2, the subject matter of which is incorporated herein by reference.

Additionally, it is possible to use perhalogenated polysilanes of the kind described in WO 2006/125425 A1, the subject matter of which is likewise incorporated herein by reference. It should be borne in mind that as a result of the higher power density of the plasma used therein, the fraction of branched compounds is generally greater than in the case of the compounds/mixtures prepared in accordance with WO 2009/143823 A2.

Thermally prepared halogenated polysilanes can be, for example, halogenated polysilanes as pure compound or as a mixture of compounds having each at least one direct Si—Si bond, the substituents consisting of halogen or of halogen and hydrogen, and the atomic ratio of substituent:silicon in the composition being at least 1:1, where
  a. the polysilane consists of rings and chains having a high fraction of branching points, of >1% based on the overall product mixture,
  b. it has a Raman molecular vibration spectrum of $I_{100}/I_{132}$ of less than 1, where $I_{100}$ is the Raman intensity at 100 $cm^{-1}$ and $I_{132}$ is the Raman intensity at 132 $cm^{-1}$, and
  c. in $^{29}Si$ NMR spectra, it possesses its significant product signals in the chemical shift range of +23 ppm to −13 ppm, −18 ppm to −33 ppm, and −73 ppm to −93 ppm, when the substituents are chlorine.

The synthesis and the characterization of these branched halogenated polysilanes is described in WO 2009/143824 A2, the subject matter of which is incorporated herein full by reference.

The above-mentioned, thermally or plasma-chemically prepared halogenated polysilanes may optionally, in particular as a result of the process, exhibit a certain thermal decomposition, of the kind which can be carried out deliberately in accordance with WO 2009/143825 A2. In this respect, with the methods identified above, more particularly in cases of prolonged exposure to temperatures >300° C., it is also possible in certain cases for there to be halogenated polysilanes or halogenated polysilane mixtures having a halogen:silicon ratio which is less than that of hexadecahalodecasilane, i.e., in particular, 1.1:1 to 1.5:1 or 1.6:1. In the normal case, however, the mentioned compounds have a better solubility in $SiX_4$, more particularly $SiCl_4$, and typically also in oligohalosilanes, than the halide-containing silicon of the kind described in WO 2009/143825 A2.

The chlorine content of a compound or of a mixture is determined by complete digestion of the sample and subsequent titration of the chloride by the method of Mohr. The contents of halogens other than chlorine can be determined by analogous techniques. Determining the H content is done by integrating $^1H$ NMR spectra, using an internal standard, and comparing the integrals obtained, with the mixing ratio known. The molar masses of the halogenated polysilanes, and the average molar mass of the halogenated polysilane mixtures, are determined by freezing-point depression. From the parameters stated it is possible to determine the halogen:silicon ratio.

The amount of halogenated polysilane or of halogenated polysilane mixture added to the silicon to be purified, and in particular on the concentration of impurities in the silicon used, may be 0.1% by weight to 50% by weight, more particularly 0.5% to 10% by weight, as, for example, more than 1% by weight or else more than 2% by weight, based on the total mass of the silicon-containing material.

In step B), a mixture may be added, which comprises a silicon in powder form and at least one halogenated polysilane or which consists of these two materials.

As silicon in powder form, any kind of silicon can be used. It is possible on the one hand to take silicon which has already been purified for this purpose, but on the other hand it is also possible to use a silicon which is intended for purification.

With a mixture of this kind it is possible, for example, to prepare a paste which can subsequently be added to solid or melted, impurities-containing silicon. In contrast to the pure halogenated polysilanes of the kind described above, a paste of this kind may result in a reduction in the oxidation sensitivity of the halogenated polysilanes. This effect may be attributable to the fact that the accessible surface area of the halogenated polysilane is made smaller and, hence, the reaction with undesirable substances such as water or water vapor, for example, can be reduced substantially to the surface of the paste, but not to the total amount of the halogenated polysilane.

At first, the pulverized silicon and halogenated polysilane may also be tempered. This then produces a nonplastic bulk material having a further-reduced oxidation sensitivity. During the thermal conditioning, however, a certain loss of halogen is recorded, deriving from the fact that temperature exposure of the halogenated polysilane is accompanied—as described above—by formation of low-molecular silicon halides. In relation to the halogenated polysilanes added in step B), the added silicon fraction may play no part with respect to the empirical formula $SiX_n$ that is formed.

The at least one halogenated polysilane added in step B) may be added in encapsulated form. An encapsulated form means in particular that the halogenated polysilane cannot enter into contact with the surrounding medium without melting or destruction of the encapsulation, or that contact is limited by the possibility, perhaps, of substances being still able to diffuse through the solid material of the encapsulation (for example, oxygen or water molecules). With an encapsulation of this kind, therefore, the halogenated polysilane can be protected optimally from environmental effects and can be brought, for example, into a storable form. The encapsulation, which may be designed in the manner, for example, of an ampoule, can then be opened or destroyed in case of need so that the halogenated polysilane does not come into contact with its surroundings until the point in time at which such contact is also desired.

The encapsulation may more particularly consist of or comprise silicon since silicon is present in any case in the melt. This silicon may be present in particular in elemental form as a layer within the encapsulation, but may also form the encapsulation entirely.

Alternatively, it is also conceivable for the encapsulation to comprise or consist of silica glass in which case, then, not only silicon, but also oxygen as well is introduced into the silicon melt for purification. The silicon dioxides originating from the silica glass then form a slag which floats on the resultant purified silicon and can therefore easily be removed, or which, in the form of silicon monoxide, evaporates from the surface.

Where the halogenated polysilanes thus encapsulated are employed in the method, mixing of the halogenated polysilane with the silicon to be purified may be accomplished by the silicon encapsulation itself melting, where, only in this state, distribution of the halogenated polysilane and/or of the decomposition products, formed in the interim, occurs in the silicon melt, and so in this case there is no outgassing of decomposition products during the heating procedure. Alternatively, an encapsulation, more particularly an encapsulation made of silica glass such as an ampoule, for example, may also burst in the silicon melt since the increased temperature of the silicon melt results in a decomposition reaction of the polychlorosilane within the silica glass ampoule, thereby forming a overpressure which the silica glass is ultimately no longer able to withstand.

We also provide a material which can be employed in particular for the last-described alternatives of the method. The material comprises a silicon-halogen compound, more particularly a halogenated polysilane or a mixture of halogenated polysilanes, but may also comprise a halide-containing silicon of the kind described, for example, in WO 2009/143825 A2, the subject matter of which is incorporated herein by reference. Besides these silicon-halogen compounds, the material further comprises a protective material against moisture. This protective material against moisture may more particularly be the above-described silicon or else silicon dioxide. As already noted above, a material of this kind may be present, for example, in the form of a paste with an oxidation sensitivity which is reduced since the surface area of the halogenated polysilane or of the halide-containing silicon in contact with the surroundings can be reduced. For this purpose, for example, it is also possible to use an additional binder.

The above-described material may be formed such that the protective material against moisture surrounds the silicon-halogen compounds in the manner of an encapsulation. Thus, for example, the protective material may form an ampoule containing the silicon-halogen compound. An ampoule of this kind may consist, for instance, of silicon or may comprise silicon, or may consist of or comprise silica glass. With an ampoule of this kind, the silicon-halogen compounds referred to above can be brought into a storable form, in which decomposition on the basis of unwanted media (such as water, for example) can be lessened or prevented.

The invention claimed is:

1. A method for removing impurities from silicon, comprising:
   A) providing metallic silicon having impurities,
   B) mixing the metallic silicon with at least one halogenated polysilane of Formula $SiX_n$, where X is halogen, which may be partly replaced by hydrogen, and where $1<n<2.5$, and
   C) i) heating the metallic silicon of A) prior to the mixing of B), or ii) heating a mixture of the metallic silicon and the at least one halogenated polysilane of B) so that there is at least partly a reaction of the impurities with the at least one halogenated polysilane or with a decomposition product of the at least one halogenated polysilane, wherein in B) the at least one halogenated polysilane is added in encapsulated form and the encapsulation consists of or comprises silica glass.

2. The method according to claim 1, wherein the silicon to be purified is metallurgical silicon.

3. The method according to claim 1, wherein the impurities react at least partly with the at least one halogenated polysilane to give reaction products which are able to evaporate and/or sublimate out from a heated mixture or can be removed from the silicon by dissolution in a slag formed on the heated silicon.

4. The method according to claim 1, wherein the impurities are removed on heating from the silicon which is still solid and/or from the melting silicon and/or from the silicon which has already melted.

5. The method according to claim 1, wherein before B) a melt of silicon to be purified is present.

6. The method according to claim 1, wherein a halogen:silicon weight ratio of the halogenated polysilane or an average halogen:silicon weight ratio of a mixture of halogenated polysilanes is between 1:1 and 2.5:1.

7. The method claim 1, wherein the halogenated polysilane is a polychlorosilane and a mixture of halogenated polysilanes is a mixture of polychlorosilanes.

8. The method according claim 1, wherein the metallic silicon to be purified is in powder form.

9. A method for removing impurities from silicon, comprising:
   A) providing metallic silicon having impurities,
   B) mixing the metallic silicon with at least one halogenated polysilane of Formula $SiX_n$, where X is halogen, which may be partly replaced by hydrogen, and where $1<n<2.5$, and
   C) i) heating the metallic silicon of A) prior to the mixing of B), or ii) heating a mixture of the metallic silicon and the at least one halogenated polysilane of B) so that there is at least partly a reaction of the impurities with the at least one halogenated polysilane or with a decomposition product of the at least one halogenated polysilane, wherein an amount of added halogenated polysilane or of added mixture of halogenated polysilane is 0.1% by weight to 50% by weight based on a total amount of the metallic silicon.

10. The method according to claim 9, wherein the silicon to be purified is metallurgical silicon.

11. The method according to claim 9, wherein the impurities react at least partly with the at least one halogenated polysilane to give reaction products which are able to evaporate and/or sublimate out from a heated mixture or can be removed from the silicon by dissolution in a slag formed on the heated silicon.

12. The method according to claim 9, wherein the impurities are removed on heating from the silicon which is still solid and/or from the melting silicon and/or from the silicon which has already melted.

13. The method according to claim 9, wherein before B) a melt of silicon to be purified is present.

14. The method according to claim 9, wherein a halogen:silicon weight ratio of the halogenated polysilane or an average halogen:silicon weight ratio of a mixture of halogenated polysilanes is between 1:1 and 2.5:1.

15. The method claim 9, wherein the halogenated polysilane is a polyehlorosilane and a mixture of halogenated polysilanes is a mixture of polychlorosilanes.

16. The method according claim 9, wherein the metallic silicon to be purified is in powder form.

* * * * *